Figure 1:
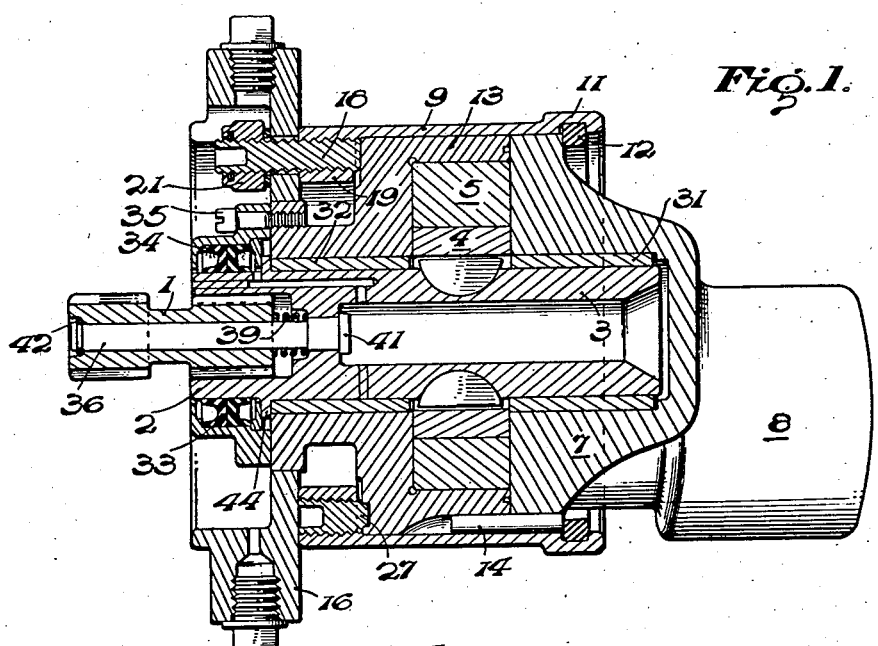

April 3, 1945.  D. J. DESCHAMPS ET AL  2,372,816

ENGINE ACCESSORY

Filed Sept. 16, 1942

Inventors
Desire J. Deschamps
Bernard H. Dow
Douglas C. Clarke

By

Martin J. Finnegan Attorney

Patented Apr. 3, 1945

2,372,816

UNITED STATES PATENT OFFICE 2,372,816

ENGINE ACCESSORY

Desire J. Deschamps, Rutherford, Bernard H. Dow, Nutley, and Douglas C. Clarke, Mountain Lakes, N. J., assignors to Bendix Aviation Corporation, South Bend, Ind., a corporation of Delaware Application September 16, 1942, Serial No. 458,550

2 Claims. (Cl. 220—4)

This invention relates to internal combustion engines, and particularly to the problem of constructing accessories in such manner that they can conveniently be mounted upon an internal combustion engine, in such a position as to facilitate both the operation of the accessory and the attachment of other fittings (as for electric or hydraulic conduits) thereto. Such a problem is present whenever an internal combustion engine is to be installed upon a vehicle or in any other location where space is limited; but the problem is most acute in aircraft installations, for aircraft installations afford a minimum of space, particularly in the region allotted to the power plant.

Practically all engine accessories require fittings for attachment of cables or conduits, whether electrical, pneumatic, or hydraulic. They also require a fitting (usually a flange integral with the accessory housing) for attachment to the engine housing, for support thereon, adjacent the accessory drive-shaft. Moreover, through-bolts are usually employed to hold together the several housing sections—a sectional housing being employed because it is generally impractical, if not physically impossible, to mount the entire assembly in a single piece of metal.

Where the accessory carries fluid under pressure, as in pumps and fluid motors, there is a tendency to develop leaks along the mating surfaces of the housing sections, as through-bolts do not maintain the sealing pressure uniformly at all radial points, and in many instances even the spacing of the bolts lacks uniformity, because of lack of symmetry in the design of the housing. The present invention solves this problem by providing means acting uniformly throughout the periphery of the housing to hold one housing section in tight, sealing relationship to the other.

An object of the present invention, therefore, is to provide an engine accessory construction involving novel means for retaining the several parts in assembled relationship.

A further object is to provide an accessory construction in which all conduit terminals are located on the rear end surface of the accessory, where the conduits can most conveniently be attached.

Another object is to provide an accessory construction in which the major portion of the housing presents a smooth outer surface, and to which the conduit terminal end of the unit is attached without the use of screws or bolts.

These and other objects of the invention will become apparent from inspection of the following specification when read with reference to the accompanying drawing wherein is illustrated the preferred embodiment of the invention. It is to be expressly understood, however, that the drawing is for the purpose of illustration only, and is not designed as a definition of the limits of the invention, reference being had to the appended claims for this purpose.

Figure 2:
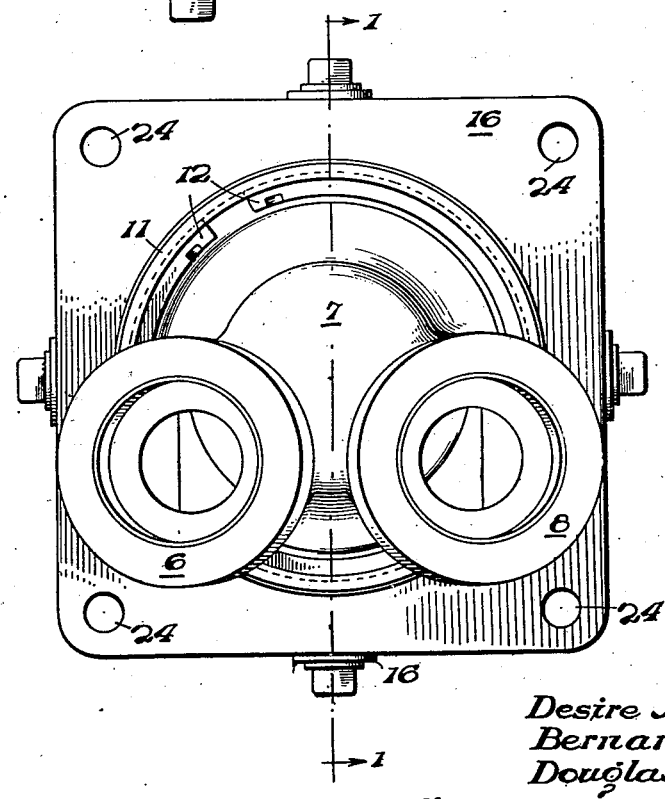

Fig. 1 is a longitudinal sectional view of a pump adapted to be driven by an internal combustion engine and mounted adjacent such engine embodying the invention; and Fig. 2 is an end view of the pump shown in Fig. 1.

The illustrated pump is of a type in which an inner rotor 4 has continuous sliding contact with an outer rotor 5 which is rotated by said inner rotor, but about an axis eccentric to the axis that is common to the inner rotor 4 and the shaft 3 which drives said rotor; the number of inter-engageable teeth of the inner rotor being one less than that of the outer rotor and said teeth being formed as indicated in patent to Hill No. 1,682,563 and in other patents of the same inventor. The shaft 3 is in turn adapted to be rotated by the engine driven member 1 which has splined connection with the outer extension 2 of the main pump shaft 3. Rotation of the pump elements 4 and 5 results in a pumping of fluid which the pump receives by way of the intake conduit which attaches to the intake terminal 6, the fluid entering the space between rotors 4 and 5 by way of a passage through the casting 7 and subsequently being delivered to the outlet conduit which attaches to the outlet conduit terminal 8 (Fig. 2) by way of another passage in the casting 7.

This casting 7 includes the two conduit terminals 6 and 8 as integral parts thereof, and is retained in assembled relationship to the rotors 4 and 5 by novel means comprising a smoothly machined barrel 9 having a circumferentially grooved portion 11 in which is received a transversely cut circular ring 12 of resilient material such as spring steel, permitting the ring to be snapped into locking engagement as between the casting 7 and the grooved portion 11 of the barrel in a fashion analogous to the insertion of a piston ring between a piston and cylinder of an internal combustion engine. As an additional means of completing the assembly, which includes the eccentrically bored rotor receiving element 13, there is employed a pin or dowel 14 which passes through registering notches in the members 7 and 13 and is, of course, inserted prior to insertion of the split ring 12.

The parts above enumerated are in turn secured to the supporting plate 16 of the pump by a series of angularly spaced studs 18 which have threaded engagement with correspondingly threaded angularly spaced apertures in the inwardly extending circular flange 19 of the barrel 9. Alternately disposed screws 18 receive attaching nuts 21 by which the supporting plate 16 is held to the remainder of the assembly prior to being installed upon the engine housing. For this latter function, the mounting plate 16 is provided with apertures 24 through which may pass the mounting screws or other means by which the pump is to be retained on the engine housing to be driven by the engine.

Those screws 18 which do not receive the attaching nuts 21 are adapted to enter counterbored recesses in the element 13, as indicated at 27 in Fig. 1. Thus, these alternately disposed screws constitute a means of securing the barrel 9 to the remainder of the assembly including the elements 4, 5, 7 and 13 prior to attachment to the final supporting plate 16. By the same token, they constitute a means for retaining the sub-assembly intact even though the said sub-assembly should be at any time removed from the supporting plate 16 as by removal of the nuts 21.

Suitable sealing means include the cylindrical liners 31 and 32, the annular sealing rings 33 and the housing element or stuffing box 34, which is held to the member 13 by the screws indicated at 35. A pin 36 extends through the center of the elements 1 and 2 to hold the former to the latter, but permitting axial play therebetween within the limits of the compression spring 39; the assembly being locked to the pump by reason of the head formation 41 on one end of the pin and the locking ring 42 at the outer end, and also by reason of the flange 44 which prevents relative axial movement as between the elements 2 and 34 after the attaching screws 35 have been inserted.

It will be noted that the embodiment illustrated is of such construction and inter-relationship of parts as to accomplish the above recited objects of the invention and additionally possesses other advantages which will be apparent to those skilled in the art and which are embraced within the scope of the appended claims.

What is claimed is:

1. In a housing assembly, a pair of housing elements having confronting mating faces means for holding said elements in sufficiently tight relationship to prevent passage of fluid between said faces, said means including an encircling member having a groove extending about its inner periphery circumjacent one of said elements, a split ring fitting into said groove and abutting said last mentioned element, said member provided with a flange abutting the other element, adjusting screws carried by said flange and engaging the other element and coacting with said ring for rendering said relationship effective, and a supporting plate secured to said other element and covering said screws.

2. The structure of claim 1 as set forth and defined therein including, conduits for said assembly carried by one of said elements and extending abaxially through said ring and outside of said member, and a dowel extending through said elements and confined therein by said ring for preventing relative rotation of said elements so as to maintain said conduits in fixity with both of said elements.

DESIRE J. DESCHAMPS.
DOUGLAS C. CLARKE.
BERNARD H. DOW.